(12) United States Patent
Zhao et al.

(10) Patent No.: US 11,012,302 B2
(45) Date of Patent: May 18, 2021

(54) SELF ORGANIZING NETWORK COORDINATION METHOD, DEVICE, AND SYSTEM

(71) Applicant: Huawei Technologies Co., Ltd., Guangdong (CN)

(72) Inventors: Dong Zhao, Shanghai (CN); Kai Zhang, Shanghai (CN); Lan Zou, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 499 days.

(21) Appl. No.: 14/444,648

(22) Filed: Jul. 28, 2014

(65) Prior Publication Data
US 2014/0337490 A1   Nov. 13, 2014

Related U.S. Application Data

(63) Continuation of application No. PCT/CN2013/070925, filed on Jan. 24, 2013.

(30) Foreign Application Priority Data

Jan. 30, 2012   (CN) .......................... 201210020773.7

(51) Int. Cl.
*H04L 12/24*   (2006.01)
*H04W 24/02*   (2009.01)
*H04W 84/18*   (2009.01)

(52) U.S. Cl.
CPC ........ *H04L 41/0823* (2013.01); *H04L 41/046* (2013.01); *H04W 24/02* (2013.01); *H04W 84/18* (2013.01)

(58) Field of Classification Search
USPC ................................................. 709/217–220
See application file for complete search history.

(56) References Cited

U.S. PATENT DOCUMENTS

2003/0217129 A1* 11/2003 Knittel ................ H04L 41/0856
                                                         709/223
2010/0299419 A1* 11/2010 Ramankutty ......... H04W 24/02
                                                         709/221
(Continued)

FOREIGN PATENT DOCUMENTS

CN      101119308 A    2/2008
CN      101272343 A    9/2008
(Continued)

OTHER PUBLICATIONS

München, Tobias Bandh-TU, and Raphael Romeikat-Uni Augsburg. "Policy-based Coordination and Management of SON Functions." pp. 827-840.*

(Continued)

*Primary Examiner* — George C Neurauter, Jr.
(74) *Attorney, Agent, or Firm* — Womble Bond Dickinson (US) LLP

(57) ABSTRACT

The present invention provides a SON coordination method, device, and system, and the method includes: obtaining a coordination parameter of a self organizing network function; and coordinating running of the self organizing network function according to the coordination parameter. The coordination parameter of the SON function is obtained before running of a current SON function, so as to use the obtained coordination parameter to coordinate the running of the SON function. In this way, the running of the current SON function may cooperate and coordinate with another SON, thereby avoiding a conflict, more efficiently, more smoothly, and lower repeatedly solving a network problem, improving network application efficiency, or reducing wrong adjustment of a network parameter caused by wrong judgment, which affects user service experience, so as to
(Continued)

achieve an object of reducing an operating cost, and improving an utilization rate of an equipment and funds.

15 Claims, 6 Drawing Sheets

(56) References Cited

U.S. PATENT DOCUMENTS

| | | | | |
|---|---|---|---|---|
| 2011/0045835 | A1* | 2/2011 | Chou | H04L 41/0806 455/446 |
| 2011/0105139 | A1* | 5/2011 | On | H04W 16/10 455/453 |
| 2011/0249558 | A1* | 10/2011 | Raaf | H04W 24/02 370/237 |
| 2012/0009912 | A1 | 1/2012 | Wang et al. | |
| 2012/0213057 | A1* | 8/2012 | Zhang | H04W 24/02 370/216 |
| 2012/0320766 | A1* | 12/2012 | Sridhar | H04W 24/02 370/252 |
| 2013/0279368 | A1* | 10/2013 | Chou | H04W 4/06 370/254 |
| 2013/0294286 | A1* | 11/2013 | Schmelz | H04W 24/02 370/254 |
| 2014/0040450 | A1* | 2/2014 | Sanneck | H04L 41/04 709/223 |
| 2015/0106339 | A1* | 4/2015 | Hasan | H04L 41/0863 707/684 |
| 2017/0134524 | A1* | 5/2017 | Ali-Tolppa | H04W 24/02 |

FOREIGN PATENT DOCUMENTS

| | | | |
|---|---|---|---|
| CN | 201130419 | Y | 10/2008 |
| CN | 101964985 | A * | 2/2011 |
| CN | 102056206 | A | 5/2011 |
| CN | 102056336 | A | 5/2011 |
| EP | 1 517 571 | A1 | 3/2005 |
| EP | 2 410 695 | A1 | 1/2012 |
| EP | 2410783 | | 1/2012 |
| EP | 2 487 951 | A1 | 8/2012 |
| WO | 2010105444 | A1 | 9/2010 |
| WO | WO 2011/050753 | A1 | 5/2011 |
| WO | WO 2012/143055 | A1 | 10/2012 |

OTHER PUBLICATIONS

Buttyán, Levente, and Jean-Pierre Hubaux. "Stimulating cooperation in self-organizing mobile ad hoc networks." Mobile Networks and Applications 8, No. 5 (2003): 579-592.*
http://www.5gamericas.org/files/2914/0759/1358/Self-Optimizing_Networks-Benefits_of_SON_in_LTE-July_2011.pdf.*
Oliver Scheit. "Self-Healing in Self-Organizing Networks", Seminars FI / IITM SS 2014, Network Architectures and Services, Aug. 2014, 6 pages. (Year: 2014).*
"3rd Generation Partnership Project; Technical Specification Group Services and System Aspects; Telecommunication management; Configuration Management (CM); Generic network resources Integration Reference Point (IRP); Network Resource Model (NRM) (Release 10)", 3GPP TS 32.622 v10.0.0, Mar. 2011, 28 pages.
"3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)", 3GPP TS 32.522 v11.1.0, Dec. 2011, 32 pages.
Neil Scully, et al., "Measurements, Architectrure and Interfaces for Self-organising Networks", Seventh Framework Programme, Oct. 31, 2010, 47 pages.
"A Deliverable by the NGMN Alliance",3GPP Draft;NGMN_TOP_OPE_RECOMMENDATIONS_1.0,3rd Generation Partnership Project,Mobile Competence Centre,Sep. 21, 2010,total 92 pages.

* cited by examiner

| SON coordination interface (SON Coordination Interface) |
|---|
| SON sequence number (SON ID) |
| Execution sequence |
| Target value |
| Scope |
| Time |
| Coordination characteristic |
| Data valid or invalid time |
| Starting type |
| Running state |

SELF ORGANIZING NETWORK COORDINATION METHOD, DEVICE, AND SYSTEM

CROSS-REFERENCE TO RELATED APPLICATIONS

This application is a continuation of International Application No. PCT/CN2013/070925, filed on Jan. 24, 2013, which claims priority to Chinese Patent Application No. 201210020773.7, filed on Jan. 30, 2012, both of which are hereby incorporated by reference in their entireties.

TECHNICAL FIELD

The present invention relates to the field of communications technologies, and in particular, to a self organizing network (SON) coordination method, device, and system.

BACKGROUND

A self organizing network (SON) is a key standardization thematic work of the 3rd generation partnership project (3GPP) standard organization in the R8/9/10 work phase, and a core idea of the SON is to reduce conventional manual operation and reduce maintenance cost of a network operator through automatic processes in stages such as network planning, deployment, optimization, and maintenance.

The SON is a set of many automation functions. In practical applications, when a network problem (such as troubleshooting) is being solved or when a network is being optimized, not a single SON function may be invoked, but more often multiple SON functions are collaboratively invoked, and the invocation form may be, for example, invocation in sequence, or parallel invocation, which is not limited in one form.

Due to a similar operation scope, a similar operation parameter, and the like between or among SON functions, each of the SON functions may face a mutual coordination problem. For example, a conflict occurs, a network problem is solved repeatedly, and degradation of network performance affects user experience.

Therefore, a SON coordination technology is needed, so as to solve the mutual coordination problem caused by collaborative invocation of an existing SON.

SUMMARY

In view of the above, a self organizing network coordination method, device, and system are provided, so as to solve a mutual coordination problem caused by collaborative invocation of an existing SON.

In one aspect, a self organizing network coordination method is provided, including: obtaining a coordination parameter of a self organizing network function; and coordinating running of the self organizing network function according to the coordination parameter.

In another aspect, a self organizing network coordination device is provided, including a storage unit and a control unit, where the storage unit stores a program code, and the control unit loads the program code to execute the operation of the foregoing self organizing network coordination method.

In another aspect, a self organizing network coordination device is provided, including: an interface module, configured to obtain a coordination parameter of a self organizing network function; and a coordination module, configured to coordinate running of the self organizing network function according to the coordination parameter.

In another aspect, an access network node is provided, including one of the foregoing self organizing network coordination devices.

In another aspect, a network management node is provided, including one of the foregoing self organizing network coordination devices.

In another aspect, a self organizing network coordination system is provided, including: multiple self organizing network function modules, and each self organizing network function module includes one of the foregoing self organizing network coordination devices, where the multiple self organizing network function modules share data through their interface modules to obtain their respective coordination parameters.

In another aspect, a self organizing network coordination system is provided, including: multiple self organizing network function modules, and one of the foregoing self organizing network coordination devices, where the self organizing network coordination device obtains data of the multiple self organizing network function modules through an interface module to obtain a coordination parameter of a self organizing network function to be started, and coordinates running of the self organizing network function to be started.

It can be seen that, in the SON coordination method, device, and system, a coordination parameter of a current SON function is obtained before the current SON function is started, so as to use the obtained coordination parameter to coordinate the running of the SON function, which specifically includes manners such as coordinating startup, coordinating monitoring, and coordinating termination. The coordination parameters may come from another SON function, and may also come from data preset by a network. In this way, the running of the current SON function may cooperate and coordinate with another SON, thereby avoiding a conflict, more efficiently, more smoothly, and lower repeatedly solving a network problem, improving network application efficiency, or reducing wrong adjustment of a network parameter caused by wrong judgment, which affects user service experience, so as to achieve an object of reducing an operating cost, and improving an utilization rate of an equipment and funds.

DETAILED DESCRIPTION

Figure 1:
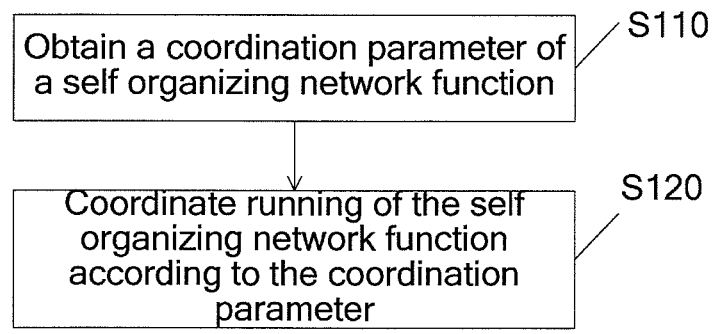
FIG. 1 is a schematic flow chart of a self organizing network coordination method provided in Embodiment 1 of the present invention.

The following clearly describes the technical solutions in the embodiments of the present invention with reference to the accompanying drawings in the embodiments of the present invention. Apparently, the described embodiments are only a part rather than all of the embodiments of the present invention. All other embodiments, which can be derived by persons of ordinary skill in the art from the embodiments of the present invention without creative efforts, shall fall within the protection scope of the present invention.

It is mentioned in the background that, a self organizing network (SON) is a set of many automation functions, and due to a similar operation scope, a similar operation parameter, and the like between or among SON functions, each of the SON functions may face a mutual coordination problem. For example, running of a cell coverage & capacity optimization (CCO)/cell outage compensation (COC) function or cell outage detection & compensation (CODC) function may induce a change of a neighbor relationship in an area, and an automatic neighbor relationship (ANR) function needs to be coordinately started, so as to readjust the neighbor relationship in this area, and ensure a quality of service. For another example, both mobility robust optimization (MRO) and mobility load balance (MLB) relate to optimization and adjustment of a cell individual offset (CIO) value, and therefore, an optimized and adjusted CIO value needs to be notified to MLB after MRO optimization is performed; likewise, an optimized and adjusted CIO value needs to be notified to MRO after MLB optimization is performed.

It can be seen that, independent functions of SON, for example, COC/CCO, ANR, MRO, MLB, need to cooperate and coordinate with each other, thereby avoiding a conflict, more efficiently, more smoothly, and lower repeatedly solving a network problem, improving network application efficiency, or reducing wrong adjustment of a network parameter and injured user service experience caused by wrong judgment, so as to achieve an object of reducing an operating cost of an operator, and improving an utilization rate of an equipment and funds.

Therefore, a self organizing network coordination method, device, and system are provided in the following, and before running of a SON function, a coordination parameter that affects the running of the SON function is obtained first, and then the running of the SON function is coordinated according to the coordination parameter. The coordination parameter may be a parameter involved with or changed by running of another SON function, and have a reference or guidance significance to a current SON function to be run. In this way, the current SON function to be run can be effectively coordinated, thereby improving its running efficiency, and avoiding a possible conflict and network performance reduction during the running process. Specifically, it is described with reference to the accompanying drawings in the following:

It should be noted that, a running moment of a SON function herein may be a starting moment of the SON function, and may also be a moment at which the SON function modifies a network; and correspondingly, a moment before the running of the SON function may refer to a moment at which the SON function is not started, or a moment at which the SON function has not modified a network.

Embodiment 1

Referring to FIG. 1, FIG. 1 is a schematic flow chart of a self organizing network coordination method provided in Embodiment 1 of the present invention, and as shown in the figure, the method includes the following steps:

S110: Obtain a coordination parameter of a self organizing network function.

S120: Coordinate running of the self organizing network function according to the coordination parameter.

The SON function in the foregoing steps is a SON function to be started or to be invoked, which is referred to as a current SON function in the following.

Preferably, the coordination parameter includes one or more pieces of the following data: an execution sequence, a target value, a scope, time, a coordination parametric value, data valid or invalid time, a starting type, and a state value. Each data is described in detail in the following:

1). The execution sequence is used to indicate an execution sequence between a current SON function and another SON function. It is because that running of a SON function may change some configuration of a network, and then another SON function needs to be invoked to readjust the network, so as to ensure a quality of service; in addition, execution of a SON function may affect another SON function. Therefore, a set execution sequence between or among SON functions make it clear that during a coordination process, the current SON function is started after running of which SON function, or which SON function is invoked after the running of the current SON function ends. For example, running of a CCO/COC function may induce a change of a neighbor relationship in an area, and an ANR function needs to be coordinately started, so as to readjust the neighbor relationship in this area, and ensure a quality of service:

It should be noted that, the execution sequence may be set as default; and may also be set as settable to a user, so that an operator may set the execution sequence according to a requirement; of course, the two aspects may also be combined, which is not limited by the present invention.

2). The target value is used to indicate a condition followed by or a target to be achieved by running of a current SON function. Because running of different SON functions may improve or degrade network performance, the target value is needed to indicate an object or a running termination condition commonly followed by these SON functions. In this way, stability of the network performance is ensured, and once running of a SON function leads to that the network performance is degraded or degraded to an unacceptable degree of an operator, the running of the SON function can be terminated in time. For example, the network performance may be reflected in increase and decrease of some key performance indicators (KPI), and when multiple indicators exists, the operator may designate a priority sequence, indicating a sequence preferentially met by a SON function.

Figure 2:
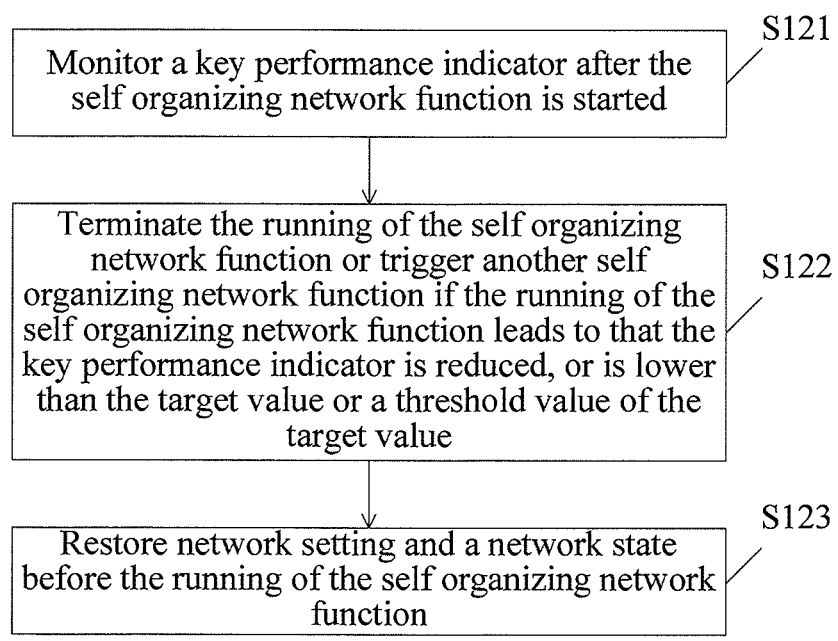
FIG. 2 is a schematic flow chart of a method for performing self organizing network coordination according to a target value provided in Embodiment 1 of the present invention.

Specifically, one or more target values may exist, and correspond to one or more key performance indicators of a network. The coordinating step where the target value is applied, the foregoing Step S120, includes the following steps: as shown in FIG. 2.

S121: Monitor a key performance indicator after the self organizing network function is started.

S122: Terminate the running of the self organizing network function or trigger another self organizing network function if the running of the self organizing network function leads to that the key performance indicator is lower than the target value or a threshold value of the target value.

When the running of the self organizing network function is terminated or another self organizing network function is triggered, the following may also be included.

S123: Restore network setting and a network state before the running of the self organizing network function.

The target value may be a KPI value monitored before running of a current SON function, so as to prevent a KPI optimized and increased by a previous SON function from being decreased by a current coordinately started SON function in an operation process, and if decrease occurs, the running of the current SON function needs to be terminated in time; the target value may also be a preset value, which is a KPI value followed by or achieved by all SON functions, the purpose is to ensure that the impact of the running of each SON function on the network performance is within a controllable scope, and after running of a SON function producing negative effect is terminated, network state can be rolled back to the state before the running of the SON function, including rollback of a network environment variable, and an environment parameter. Of course, the two conditions may also be combined, and different conditions may be set for different SON functions.

In addition, it should be noted that, for different operators, or different key performance indicators, requirements to the network performance may be different, and therefore, a determining condition of a threshold value of a target value is set. For example, when KPI includes a handover success rate and a rate reflecting a quality of service, a threshold value of the handover success rate may be set as 100%, and a threshold value of the rate may be set as 80%. That means, the requirement to the handover success rate is that 100% of the target value is met, and the requirement to the rate is that it is fine as long as 80% of the target value is met. This is set according to the requirement of the operator, which is not limited in the present invention.

Correspondingly, multiple KPIs may exist, and a priority sequence is set between or among these KPIs. In this case, whether a SON function reaches or is better than the target value may be determined according to the priority sequence of these KPIs in the Step S122.

It should be noted that, the number of the foregoing target values and the priority sequence of the foregoing target values are set according to the requirement of the operator, which is not limited in the present invention.

3). The scope is used to indicate a running scope of a current SON function, and may include one or more cells, or one or more base stations, a sub-network, or a whole network.

The scope may be information of an area changed after running of another SON function. Specifically, the scope may include information of an area changed by a SON function running before running of the current SON function, and when the current SON function is coordinately started, the current SON function runs in the scope. For example, after a SON (such as: CCO/COC) runs, an area may be changed, and the area may serve as an operation scope of another SON (such as: ANR). So an area involved with running of the SON is reduced by indicating a working scope of the SON, thereby improving its efficiency.

4). The time is used to indicate a starting moment and/or running time of the current SON function. Specifically, two cases exist for the parameter:

In the first case, the time is used to indicate a running lifetime duration or a termination moment: when a current SON function is coordinately started, a running lifetime duration or a termination moment of the SON function is designated, so as to designate that the coordinately started SON function runs in a designated duration, and once the duration expires, or the termination moment comes, running of the SON function needs to be terminated;

In the second case, the time is used to indicate a starting moment or a starting delay: when a current SON function is coordinately started, a period of time needs to be delayed or waited for, or at a designated moment, the SON function is started; it is because that after a previous SON function is terminated, a network needs to be stabilized in a period of time, and then the current SON function is started, so as to prevent a possible operation conflict or another fault caused by immediate invocation of the current SON function.

In order to distinguish the foregoing time parameters, a flag may be set before the time, which is used to determine the type or types to which the time belongs.

5). The coordination parametric value is used to provide a parameter, a parameter change value, or a changed parameter value that affects the running of the current SON function. The coordination parameter may include a parameter or a change value of the parameter changed by running of a previous self organizing network function. It is because that after running of a SON function, a network parameter may be modified, for example, CCO/COC modifies a radio frequency parameter. And the parameters and the change values of the parameters have reference significance for starting another SON function, and another coordinately started SON function may improve its own running efficiency according to the parameters and the change values of the parameters, for example, ANR may modify a neighbor relationship more rapidly and effectively of ter learning which cells are deleted or added by CCO/COC. Therefore, the coordination parametric value is provided to the current SON function, which has reference significance to the running of the current SON function, thereby improving its running efficiency.

6). The data valid or invalid time is used to indicate that monitoring data or an event or alarm data or UE measurement data of network performance is valid or invalid. Two cases exist for the parameter:

In the first case, the data valid or invalid time is a valid or invalid period, and in the period, monitoring data or an event or alarm data or UE measurement data of network performance is valid or invalid; the period includes two conditions, in the first condition, the period is a period of time before or after the moment of running a current SON function, in the other condition, a starting point or an end point of the period is not necessary to be "a moment of running a current SON function". For example, two SON functions A and B runs in a network at the same time, and function A expects to inform, through the parameter, function B that data in a certain period is "valid or invalid", where a starting point or an end point of the period is not necessary to be "a moment of running a current SON function".

In the second case, the data valid or invalid time is a valid or invalid time point, which is a designated moment, and from the designated moment to the starting moment of the current SON function, the monitoring data or event or alarm data or UE measurement data of the network performance is valid or invalid.

For example, during the running period of the current SON function, a failure or abnormality is found in a cell or a base station in a certain scope, and relevant monitoring recording in a period of time from a moment at which the abnormality occurs to a moment at which the current SON function is invoked needs to be deleted. The period of time is recorded as the valid or invalid period, and the occurrence moment of the failure or abnormality is recorded as the valid or invalid time point.

In order to distinguish the foregoing valid or invalid time parameters, a flag may be set before the valid or invalid time, which is used to determine the type to which the valid or invalid time belongs.

7). The starting type is used to indicate a starting type of the current SON function. In this way, when a current SON function is started, calculation is performed according to a running method or scenario designated by the starting type. Specifically, the starting type may include starting a high level, an intermediate, or a low level self organizing network function, may include starting a fast self organizing network function or a common self organizing network function, and may also include starting a self organizing network function according to a designated scale. For example, ANR includes a fast ANR and a common ANR, a type of starting an ANR function may be coordinated through setting the parameter.

8). The state value is used to provide a running state of another self organizing network function running before running of the current SON function, where the running state includes success, failed, or being running. This is good for multiple SON functions to exchange their state information, and facilitates the coordination.

Figure 3:
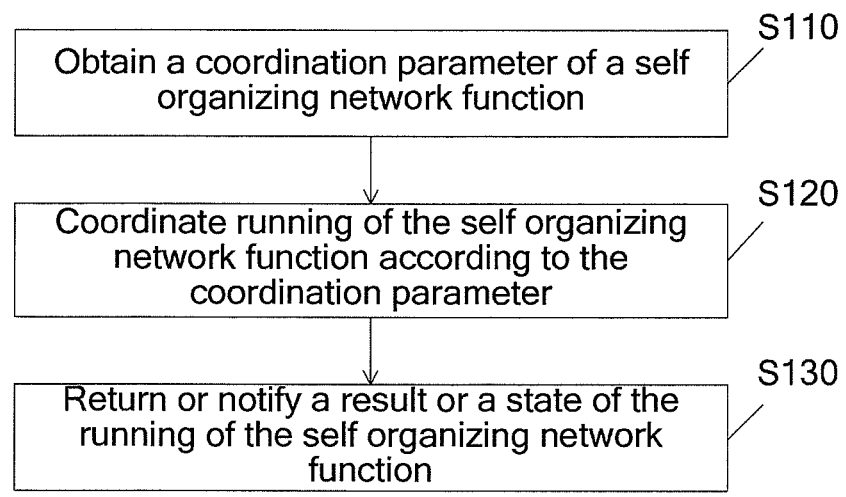
FIG. 3 is a schematic flow chart of another self organizing network coordination method provided in Embodiment 1 of the present invention.

It can be seen that, in the coordination of the foregoing step S120, manners such as coordinating startup, coordinating monitoring and coordinating termination are included. After the foregoing coordination is completed, and the running of the current SON function ends, the following step may further be included: which is shown in FIG. 3.

S130: Return or notify a result or a state of the running of the self organizing network function, where the result or the state serves as a running state parameter for coordinating a next SON function.

In the foregoing embodiment, the current SON function is no longer started directly, and before the SON function is started, the coordination parameter of the SON function is obtained, so as to use the obtained coordination parameter to coordinate the running of the SON function, which specifically includes manners such as coordinating startup, coordinating monitoring, and coordinating termination. The coordination parameters may come from another SON function, and may also come from data preset by a network. In this way, the running of the current SON function may cooperate and coordinate with another SON, thereby avoiding a conflict, more efficiently, more smoothly, and lower repeatedly solving a network problem, improving network application efficiency, or reducing wrong adjustment of a network parameter caused by wrong judgment, which affects user service experience, so as to achieve an object of reducing an operating cost, and improving an utilization rate of an equipment and funds.

However, in the foregoing coordination process, each operation of the SON function may change a network state and induce a change of the network performance. Once the change is not ideal, although the network performance will not be further deteriorated through terminating the running of the SON function, the network state cannot be restored to a previous state, and the current state may not be ideal. Therefore, in an exemplary embodiment of the present invention, an auxiliary operation process and a process of recording a state that needs to be used in the auxiliary operation process are introduced in a coordination process. The detailed description is as follows:

In the foregoing step S120, a state recording process and an auxiliary coordination operation process may also be included. Specifically, the state recording process includes: obtaining or storing a default running state of a current SON function, and/or a network state or an environment parameter before the running, and/or a network state or an environment parameter of each adjustment node during the running; and/or, obtaining or storing another SON function in a designated area or an area relevant to the current SON function, and/or a running state of the another SON function, and/or a default running state of the another SON function, and/or a network state or an environment parameter before running of the another SON function, and/or a network state or an environment parameter of an adjustment node during the running of the another SON function.

The objective of obtaining or storing another SON function in a designated area or an area relevant to the current SON function is: learning a deployment condition of SON functions of a current operator, for example, a location, including an area, a track area (TA)/routing area (RA)/location area (LA) network element.

A running state of another SON function in a designated area or an area relevant to the current SON function is obtained or stored, such as whether to be started and a running duration. The information helps to coordinate running of multiple SONs. For SON functions (conflict SON functions) cannot run at the same time, if they are running, the running should be terminated; and for SON functions whose sequences need to be coordinated or running at the same time, if they are still in a state where running is closed, running needs to be started.

A default running state of each SON function in a designated area or an area relevant to the current SON function is obtained or stored. It is because that for different SON functions, during deployment and due to the difference of policies, an operator may preset some SON functions as running allowed by default or directly set them in an on state by default, and set other functions as closed by default; obtaining the default state values or allowed values helps to restore an allowed running state or a running state thereof to a default designated state after running of a corresponding SON function ends, thereby avoiding a change of a policy of an operator due to coordination.

A network state or an environment parameter before running of each SON function in a designated area or an area relevant to the current SON function is obtained or stored. It is because that when different SON functions are coordinated, a network state or an environment parameter (such as an antenna parameter, a radio frequency (RF) parameter, or a performance indicator, or a mobility management parameter) before running of a started SON function needs to be stored in advance, so that all or a part of the parameters can be used during network rollback adjustment if the coordinately started SON function is terminated.

A network state or an environment parameter of each adjustment node in running of each SON function in a designated area or an area relevant to the current SON function is obtained or stored, so as to perform partial state rollback. For example, in an MRO optimization process, each time a CIO value is adjusted, network performance is changed, if the network performance is found to be degraded or degraded to a certain extent in an adjustment process, running of the MRO is terminated, and state rollback needs to be performed, if the network state or the environment parameter before the running is stored, the network state or the environment parameter can be rolled back to the network state or the environment parameter before the running; if a network state or an environment parameter of an adjustment is stored, partial state rollback may also be performed. Partial state rollback is performed because the stored state parameter is not complete, and the state cannot be rolled back to a state that the SON function is initially invoked and can be only rolled back partially.

It should be noted that, the foregoing state recording process may be performed before the starting of coordination, or may be performed during the coordination process, or a part of the state is recorded before the starting of coordination and a part of the state is recorded during the coordination process, which is not limited by the present invention.

In addition, an identifier or a switch may be set, so that before coordination, whether the SON function needs to be coordinated is controlled.

The foregoing auxiliary coordination process mainly includes an operation of three stages: before running, being in running, and after running of a current SON function, which are described in detail in the following:

Firstly, before the running of the current SON function: the auxiliary coordination operation process includes:

requesting to confirm starting, or no longer starting a current SON function or another SON function whose default running state is running prohibited;

terminating running of another SON function that cannot run at the same time as the current SON function, if a running state of the another SON function shows that the another SON function is running or a running priority of the another SON function is lower than a running priority of the current SON function;

not changing a running state of another self organizing network function that can run at the same time as the current SON function; and starting running of another self organizing network function that needs to run before the current SON function, if a running state of the another self organizing network function shows that the another self organizing network function is still in a closed state.

For another SON function whose running is terminated, the process further includes: restoring configuration of a network state or an environment parameter before running of the another SON function, or performing partial state rollback.

Secondly, during the running of the current SON function, a process of coordinating the running of the current SON function further includes: monitoring a network performance change during the running of the current SON function, and if a requirement of the coordination parameter is not met, the running of the current SON function is terminated. At this time, the auxiliary coordination operation process further includes: for a current SON function whose running is terminated, restoring configuration of a network state or an environment parameter before running of the current SON function, or performing partial state rollback.

Thirdly, after the running of the current SON function ends, the auxiliary coordination operation process further includes: restoring a default running state of the current SON function; and recording a state or an environment parameter of a current network.

Embodiment 2

Figure 4:
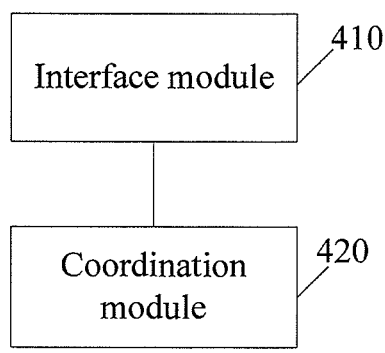
FIG. 4 is a functional block diagram of a self organizing network coordination device provided in Embodiment 2 of the present invention.

Corresponding to the foregoing SON coordination method, this embodiment further provides a SON coordination device, which is described in detail with reference to the accompanying drawings in the following:

Referring to FIG. 4, FIG. 4 is a functional block diagram of a self organizing network coordination device provided in Embodiment 2 of the present invention, and as shown in the figure, the device includes an interface module 410 and a coordination module 420. The interface module 410 is configured to obtain a coordination parameter of a self organizing network function; and the coordination module 420 is configured to coordinate running of the self organizing network function according to the coordination parameter.

The function module may be implemented in the SON function, and may also be implemented in an independent coordination entity.

As Embodiment 1, the coordination parameter includes one or more pieces of the following data: an execution sequence, used to indicate an execution sequence between the SON function and another SON function; a target value, used to indicate a condition followed by or a target to be achieved by running of the SON function; a scope, used to indicate a running scope of the SON function; time, used to indicate a starting moment and/or running time of the SON function; a coordination parametric value, used to provide a parameter, a parameter change value, or a changed parameter value, which affects the running of the SON function; data valid or invalid time, used to indicate that monitoring data or an event or alarm data or UE measurement data of network performance is valid or invalid; a starting type, used to indicate a starting type of the SON function; and a state value, used to provide a running state of another SON function running before the running of the SON function.

Each parameter is described briefly in the following, and detailed content is the same as that in Embodiment 1:

1). The execution sequence is set as default or settable to a user.

2). One or more target values exist, and correspond to one or more key performance indicators of a network. If multiple key performance indicators exist, a priority sequence may be preset. The target value may be a preset value or a key performance indicator value monitored before the running of the SON function. Correspondingly, the coordination module 420 further includes a monitoring module 421 and a terminating or triggering module 422. The monitoring module 421 is configured to monitor the key performance indicator after the SON function is started; and the terminating or triggering module 422 is configured to terminate the running of the SON function or trigger another SON function if the running of the SON function leads to that the key performance indicator is lower than the target value or a threshold value of the target value. Further, the coordination module may further include a restoration module 423, configured to restore network setting and a network state before the running of the SON function when the running of the SON function terminated or another SON function is triggered.

3). The scope includes one or more cells, or one or more base stations, a sub-network, or a whole network. The scope may include information of an area changed after running of another SON function. Further, the scope may include information of an area changed by a SON function running before the running of the SON function. When the SON function is coordinately started, the SON function runs in the scope.

4). The time includes: a starting moment or a starting delay of the SON function, and/or a running lifetime duration or a termination moment of the SON function. Further, a flag is set before the time, which is used to determine that the time is the starting moment, the starting delay, the running lifetime duration, or the termination moment of the SON function.

5). The coordination parametric value includes a parameter or a parameter change value changed by running of another SON function before the running of the SON function.

6). The data valid or invalid time includes: a valid or invalid time point, including a designated moment, and from the designated moment to a running moment of the SON function, monitoring data or an event or alarm data or UE measurement data of network performance is valid or invalid; or a valid or invalid period, where monitoring data or an event or alarm data or UE measurement data of the network performance in the period is valid or invalid. Further, a flag is set before the data valid or invalid time, which is used to distinguish the valid or invalid time point or the valid or invalid period.

7). The starting type includes: starting a high level, an intermediate, or a low level SON function, or starting a fast SON function or a common SON function, or starting a SON function according to a designated scale.

8). The running state includes success, failed, or being running.

Figures 5, 6:
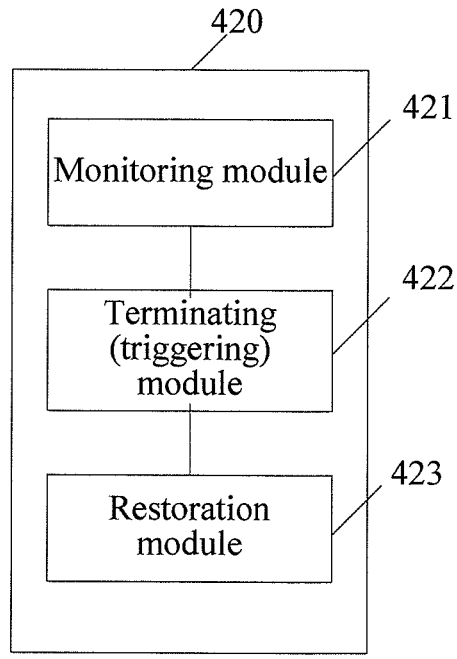
FIG. 5 is a functional block diagram of a coordination module of a self organizing network coordination device provided in Embodiment 2 of the present invention.
FIG. 6 is a schematic diagram of an interface module of a self organizing network coordination device provided in Embodiment 2 of the present invention.

The SON obtaining of the foregoing parameter may be implemented through the interface module 410, and a corresponding SON interface is shown in FIG. 6. A SON sequence number is used to identify that the coordination interface or a parameter list is used for coordination of which SON.

Figure 7:
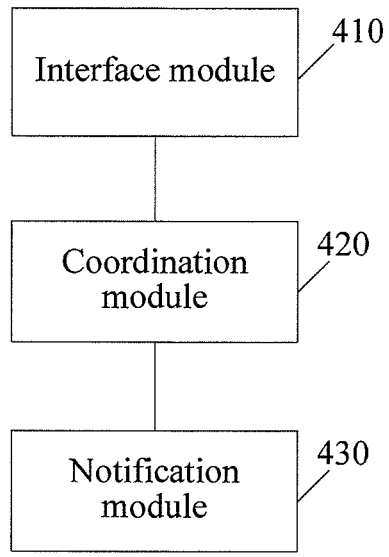
FIG. 7 is a functional block diagram of another self organizing network coordination device provided in Embodiment 2 of the present invention.
Figure 8:
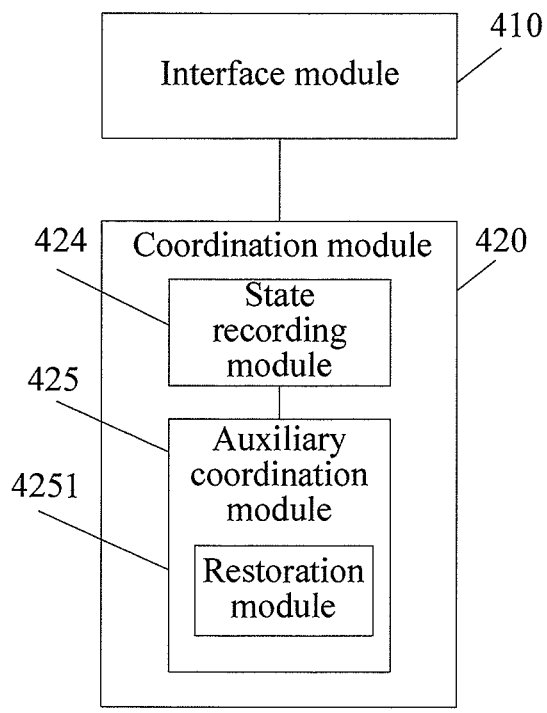
FIG. 8 is a functional block diagram of another self organizing network coordination device provided in Embodiment 2 of the present invention.

Referring to FIG. 7, in an exemplary embodiment, the SON coordination device further includes: a notification module 430, configured to return or notify a result or a state of the running of the SON function after the running of the SON function ends, and the result or the state serves as a running state parameter for coordinating a next SON function.

In the foregoing embodiment, the current SON function is no longer started directly, and before the SON function is started, the coordination parameter of the SON function is obtained, so as to use the obtained coordination parameter to coordinate the running of the SON function, which specifically includes manners such as coordinating startup, coordinating monitoring, and coordinating termination. The coordination parameters may come from another SON function, and may also come from data preset by a network. In this way, the running of the current SON function may cooperate and coordinate with another SON, thereby avoiding a conflict, more efficiently, more smoothly, and lower repeatedly solving a network problem, improving network application efficiency, or reducing wrong adjustment of a network parameter caused by wrong judgment, which affects user service experience, so as to achieve an object of reducing an operating cost, and improving an utilization rate of an equipment and funds.

However, in the foregoing coordination process, each operation of the SON function may change a network state and induce a change of the network performance. Once the change is not ideal, although the network performance will not be further deteriorated through terminating the running of the SON function, the network state cannot be restored to a previous state, and the current state may not be ideal. Therefore, in an exemplary embodiment of the present invention, a state recording module 424 and an auxiliary coordination module 425 are added in the coordination module 420.

A state that the state recording module needs to obtain or store includes one or more of the following states: a default running state of the SON function, a network state or an environment parameter before the running of the SON function, a network state or an environment parameter of an adjustment node in the running of the SON function; another SON function in a designated area or an area relevant to the SON function, a running state of the another SON function, a default running state of the another SON function, a network state or an environment parameter before running of the another SON function, and a network state or an environment parameter of an adjustment node in the running of the another SON function.

The foregoing auxiliary coordination module 425 is mainly configured to perform the operation of three stages as Embodiment 1, and correspondingly, the auxiliary coordination module 425 includes a restoration module 4251 or instructs the foregoing restoration module 423 to perform the restoring operation of the following three stages:

firstly, before the running of the SON function, for another SON function whose running is terminated, restoring configuration of a network state or an environment parameter before running of the another SON function, or performing partial state rollback;

secondly, during the running of the SON function, for the SON function whose running is terminated, restoring configuration of a network state or an environment parameter before running of the SON function, or performing partial state rollback; and thirdly, after the running of the current SON function ends, restoring a default running state of the self organizing network function; and recording a state or an environment parameter of a current network.

Embodiment 3

Figure 9:
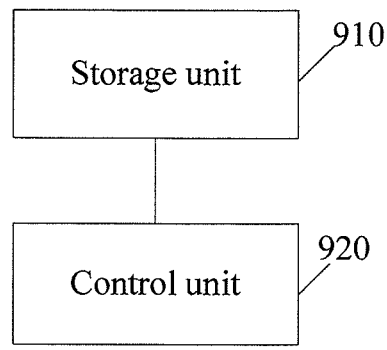
FIG. 9 is a functional block diagram of a self organizing network coordination device provided in Embodiment 3 of the present invention.

Corresponding to the SON coordination method in Embodiment 1, this embodiment further provides a SON coordination device, which is described in detail with reference to the accompanying drawings in the following:

Referring to FIG. 9, FIG. 9 is a functional block diagram of a self organizing network coordination device provided in Embodiment 3 of the present invention, and as shown in the figure, the device includes a storage unit 910 and a control unit 920, where the storage unit 910 stores a program code, and the control unit 920 loads the program code to execute steps corresponding to Embodiment 1.

Correspondingly, a computer program product is further provided, which includes a computer readable medium, where the readable medium stores a program code, and the program code is used to execute steps corresponding to Embodiment 1. The readable medium includes RAM/ROM, a magnetic disk, or an optical disk, which is not limited in the present invention.

The self organizing network coordination device provided in the foregoing Embodiment 3 and Embodiment 4 may be a physical entity or an logical function module, which is set in an access network node (such as a base station or a base station controller, BSC) or a network management node (such as an operation support system, OSS, a network element management system, EMS or a network management system, NMS), so as to start the coordination device to perform coordination before the SON function is invoked.

Embodiment 4

Figure 10:
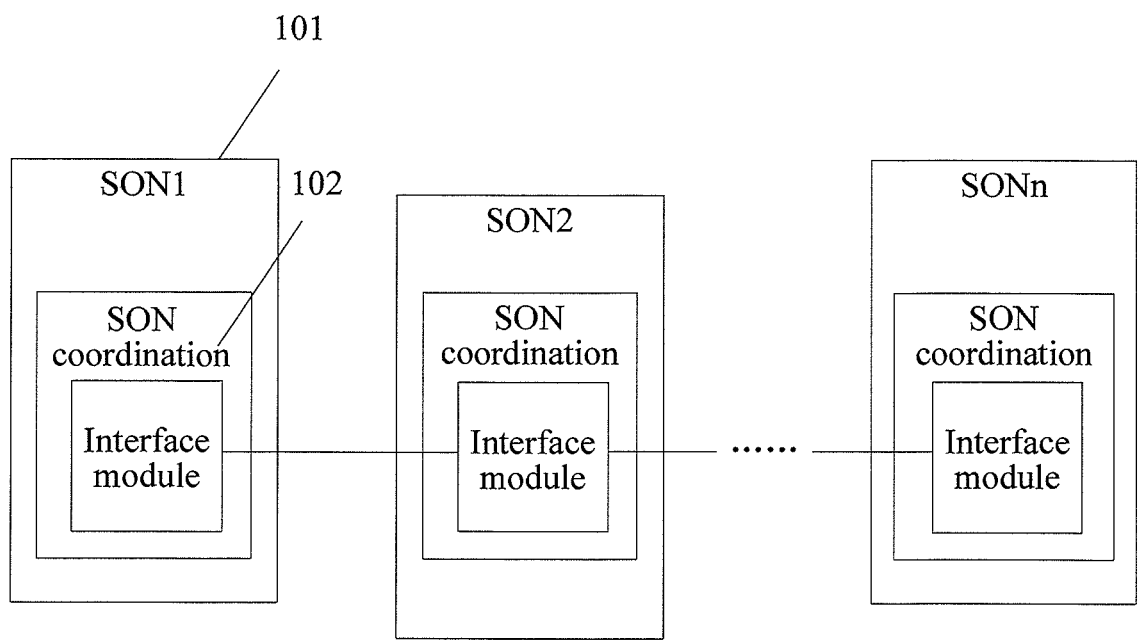
FIG. 10 is a functional block diagram of a self organizing network coordination system provided in Embodiment 4 of the present invention.

Corresponding to the SON coordination method in Embodiment 1, this embodiment further provides a SON coordination system, which is described in detail with reference to the accompanying drawings in the following:

Referring to FIG. 10, FIG. 10 is a functional block diagram of a self organizing network coordination system provided in Embodiment 4 of the present invention. As shown in the figure, the system includes: multiple SON function modules 101, and each SON function module 101 includes a SON coordination device 102, where the multiple SON function modules 101 share data through an interface module of the SON coordination device 102 to obtain their respective coordination parameters. The structure of the SON coordination device 102 is the same as any structure in Embodiments 2 and 3.

Figure 11:
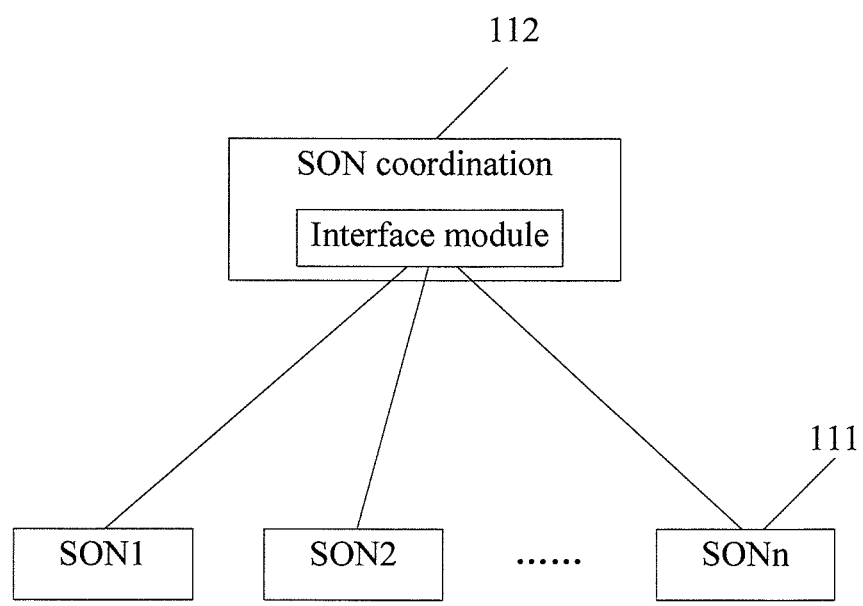
FIG. 11 is a functional block diagram of another self organizing network coordination system provided in Embodiment 4 of the present invention.

The foregoing SON coordination function is implemented in the SON function module, which is responsible for coordinating the SON function where it is located; in addition, it may also be implemented in an independent coordination entity, which is described in the following:

Referring to FIG. 11, FIG. 11 is a functional block diagram of another self organizing network coordination system provided in Embodiment 4 of the present invention. As shown in the figure, the system also includes multiple SON function modules 111 and a SON coordination device 112, and the SON coordination device is independent to each SON function module 111, and obtains data of the multiple SON function modules through an interface module to obtain a coordination parameter of a SON function to be started, and coordinate running of the self organizing network function to be started. The structure of the SON coordination device 102 is the same as any structure in Embodiments 2 and 3. To facilitate the obtaining the coordination parameter by the SON coordination device 112, each SON function module 111 may have an interface unit, which has a structure the same as that of the interface module of the SON coordination device 112, so as to report data needed by the SON coordination device 112, which is the coordination parameter.

The foregoing multiple self organizing network coordination modules include: multiple modules among a cell coverage & capacity optimization (CCO) function module, a cell outage compensation (COC) function module, an automatic neighbor relationship (ANR) function module, a mobility robust optimization (MRO) function module, a mobility load balance (MLB) function module, and an energy saving (ES) function module.

The principles and advantages of the foregoing SON coordination method, device, or system are described through coordination of a CCO/CODC function and an ANR function, an MRO function and an MLB function, an ES function and a COC function, so that persons skilled in the art may better understand the essence of the present invention, while the embodiments are not used to limit the present invention.

Embodiment 5

A coordination relationship exists between CCO/CODC and ANR, and a coordination process is as follows:

1. Before the CCO or CODC is started, a radio parameter, a mobility management parameter, a network KPI, and so on of a relevant area are stored; a running state or a default running state of the ANR having a coordination relationship with the CCO or CODC is read (the step may also be completed in step 4 in the following).

2. CCO or CODC is started, where a KPI change is monitored, and if the KPI is decreased, CCO or CODC is terminated instantly.

3. After CCO or CODC optimization is completed, or CODC compensation ends, it may be obtained that which areas, or which base stations, or which cells (including a newly added or a deleted neighboring cell) are adjusted by the function.

4. Due to the foregoing change, an ANR function of a corresponding area or base station or cell needs to be started; before starting, corresponding neighbor relationship information, a network KPI, and a mobility management parameter are stored; and information about whether the ANR is running or whether running of the ANR is allowed (which means a default running state) is read:

If the ANR is prohibited from running, the ANR is no longer started;

if the ANR is running, the ANR is not to be started, but an adjustment result about the CCO or CODC may be transferred to the ANR; and if the ANR is not running, the ANR is started.

In addition, starting the ANR to update and adjust a changed cell neighboring relationship in real time includes:

a working scope of the ANR may be designated as the area or base station or cell scope changed after running of the CCO or CODC function;

when the ANR is running, information of a newly added cell in the scope, or information about which original cell or base station fails, or information of a new neighboring cell after an original cell or base station is compensated, or a cell that is no longer a neighboring cell after cell coverage is adjusted may be obtained from the result of the running of the CCO or CODC function; and ANR starting moment may be designated as a period of time delayed after the running of the CCO or CODC ends, and the period of time is used to complete the specific adjustment operation of the CCO or CODC, and includes an operation delay caused by some engineering reasons; at the same time, an available running lifetime after the starting of the ANR may further be designated, as running of ANR affects a terminal and network performance, ANR cannot be stared for a long time or forever. Especially for a special ANR algorithm, an UE needs to be selected in advance to periodically report measurement data of a neighboring cell, and the ANR like this can only run in a period of time after the running of the CCO or CODC, once lifetime expires, ANR must be terminated no matter whether a neighbor relationship is adjusted successfully or not.

6. When the running of the CCO or CODC ends, a running allowed default value is restored, a running stop state is entered, and the state information is obtained and stored.

7. If the CODC finds that an area fails, a moment at which the cell fails and a failure scope need to be recorded, and the parameters need to be transferred to the ANR or an MRO. Because if they run, a network parameter (such as a CIO, a KPI, and a radio frequency parameter) is monitored, and for the failure area, data monitored from a failure moment to a failure solved moment is different from data monitored when the ANR or MRO is normal, and the ANR or MRO needs to consider the validity of the data, or delete the data, so as to avoid impact on an ANR or MRO algorithm.

Embodiment 6

A coordination relationship exists between MRO and MLB, and a coordination process is as follows:

1. Before the MRO is started, a radio parameter, a mobility management parameter, and a network KPI of a relevant area are stored; a running state or a default running state of the MLB having a coordination relationship with the MRO is read (the step may also be completed in step 4 in the following); because both the MRO and the MLB change CIO, the MLB needs to be terminated at this time, the MLB needs to be closed, and running allowed is set as prohibited.

2. After running of the MRO ends, a cell or base station scope optimized by the MRO is obtained. Taking the scope as a working area, the MLB (if the MLB is closed, and the MLB is allowed to be started) is started; at the same time, a corresponding CIO value, a loading value, a relevant radio frequency parameter, a default running value or allowed running value of the MLB is stored.

3. When the MLB is started, corresponding running conditions need to be set, which are as follows:

an increased network KPI (a handover success rate, handover delay, and so on) obtained from MRO optimization may serve as a target which cannot be reduced by the MLB;

a running cycle of the MLB, and/or starting delay of the MLB is set; for the MLB, after lifetime expires, no matter whether a load target is achieved or not, the MLB needs to be terminated, and its default running state is restored;

a running target of the MLB is load balance distribution, because the MRO increases a handover success rate, the MLB cannot affect the handover success rate due to load adjustment, at this time, the MRO or a coordination function needs to monitor the handover success rate during the running of the MLB, and once the KPI is affected when the MLB adjusts the CIO, the MLB needs to be terminated immediately, and a network parameter (including a mobility parameter, and a radio frequency parameter) before previous adjustment of the MLB is restored; and MLB monitoring during adjustment period of the MRO is invalid, as the network is being adjusted, a period needs to be set when the MLB is stared, to indicate a period from a starting moment of the MRO adjustment to an end, moment of the MRO adjustment, and the validity of data monitored by the MLB in the period needs to be estimated again, or data in the period is deleted.

Embodiment 7

A coordination relationship exists between an energy saving (ES) function and COC, and a coordination process is as follows:

1. An auxiliary operation, such as storing a state, a parameter, and a default value, is the same as the foregoing embodiments, and the difference lies in that:

when a network element (a cell or a base station) finds its own load is low, a condition of entering ES may be met, and then the base station decides to enter the ES by itself; the base station or the cell may fail or have a fault so that user access cannot be accepted, resulting in a low load, and the ES cannot be entered at this time; and coordination control and analysis need to be performed, and a proper operation is selected: the ES is allowed to be entered, or the COC is started to perform compensation.

2. When the network element meets the condition of entering the ES, the network element needs to be prohibited from entering the ES at once, but a minimization of driver test (MDT) or a radio link failure (RLF) needs to be started, to collect whether the network element has a fault, or search for data such as existing alarm, performance, and terminal failure report, so as to analyze whether the network element has a fault or fails;

If the network element has a fault or fails, the network element is prohibited from entering the ES, and the COC is started to perform compensation.

The area of the network that fails element and the time when the failure occurs are recorded, and others such as MRO, MLB, ANR, and ES need to delete data in this period, or re-estimate the validity of the data.

If the network element has no fault, it is considered that the network element is indeed in a normal light load, the ES may be entered, ES prohibition is relieved, and the network element may enter the ES state at this time.

To sum up, the foregoing embodiments provide a coordination technology between or among SON functions, where before a current SON function is started, the coordination parameter of the SON function is obtained, so as to use the obtained coordination parameter to coordinate the running of the SON function, which specifically includes manners such as coordinating startup, coordinating monitoring, and coordinating termination. The coordination parameters may come from another SON function, and may also come from data preset by a network. In this way, the running of the current SON function may cooperate and coordinate with another SON, thereby avoiding a conflict, more efficiently, more smoothly, and lower repeatedly solving a network problem, improving network application efficiency, or reducing wrong adjustment of a network parameter caused by wrong judgment, which affects user service experience, so as to achieve an object of reducing an operating cost, and improving an utilization rate of an equipment and funds.

What is claimed is:

1. A self organizing network coordination method, comprising:

obtaining, by a self organizing network coordination device, a coordination parameter of a self organizing network function, wherein the coordination parameter comprises a starting delay, a target value, and a coordination parametric value, wherein the coordination parametric value comprises a parameter changed by running of a previous self organizing network (SON) function or a change value of a parameter changed by running of a previous self organizing network (SON) function, and the starting delay is used to indicate a period of time after which the self organizing network function is coordinately started, and the target value comprises a key performance indicator value monitored before the running of the self organizing network function;

coordinating, by the self organizing network coordination device, running of the self organizing network function according to the coordination parameter, wherein the self organizing network function is coordinately started after the period of time indicated by the starting delay;

notifying, by the self organizing network coordination device, a result or a state of the running of the self organizing network function after the running of the self organizing network function ends, and further notifying a parameter changed by running of the self organizing network function or a change value of a parameter changed by running of the self organizing network function, wherein the changed parameter serves as a parameter for coordinating another self organizing network function; and restoring, by the self organizing network coordination device, a network setting and a network state before the running of the self organizing network function in response to a decline of the key performance indicator caused by the running of the self organizing network function.

2. The method according to claim 1, wherein the coordinating running of the self organizing network function according to the coordination parameter further comprises:

monitoring the key performance indicator after the self organizing network function is started; and terminating the running of the self organizing network function or triggering another self organizing network function in response to that the running of the self organizing network function leads to that the key performance indicator is lower than the target value.

3. The method according to claim 1, wherein the coordinating running of the self organizing network function further comprises a state recording process and an auxiliary coordination operation process.

4. The method according to claim 1, wherein the coordination parameter further comprises one or more pieces of the following data:

an execution sequence, used to indicate an execution sequence between the self organizing network function and another self organizing network function;

a scope, used to indicate a running scope of the self organizing network function; and a state value, used to provide a running state of another self organizing network function running before the self organizing network function.

5. The method according to claim 4, wherein the scope comprises information of an area changed after running of another self organizing network function.

6. The method according to claim 4, wherein the running state comprises success, failed, or being running.

7. A self organizing network coordination device, comprising a processor and a non-transitory computer readable storage medium, the non-transitory computer readable storage medium stores a program, and when the program is executed by the processor, the following steps are performed:

obtaining a coordination parameter of a self organizing network function, wherein the coordination parameter comprises a starting delay, a target value, and a coordination parametric value, wherein the coordination parametric value comprises a parameter changed by running of a previous self organizing network (SON) function or a change value of a parameter changed by running of a previous self organizing network (SON) function, and the starting delay is used to indicate a period of time after which the self organizing network function is coordinately started, and the target value comprises a key performance indicator value monitored before the running of the self organizing network function;

coordinating running of the self organizing network function according to the coordination parameter, wherein the self organizing network function is coordinately started after the period of time indicated by the starting delay;

notifying a result or a state of the running of the self organizing network function after the running of the self organizing network function ends, and further notifying a parameter changed by running of the self organizing network function or a change value of a parameter changed by running of the self organizing network function, wherein the changed parameter serves as a parameter for coordinating another self organizing network function; and restoring a network setting and a network state before the running of the self organizing network function in response to a decline of the key performance indicator caused by the running of the self organizing network function.

8. The device according to claim 7, wherein the coordinating running of the self organizing network function according to the coordination parameter further comprises:

monitoring the key performance indicator after the self organizing network function is started; and terminating the running of the self organizing network function or triggering another self organizing network function in response to that the running of the self organizing network function leads to that the key performance indicator is lower than the target value.

9. The device according to claim 7, wherein the coordinating running of the self organizing network function further comprises a state recording process and an auxiliary coordination operation process.

10. The device according to claim 7, wherein the coordination parameter further comprises one or more pieces of the following data:

an execution sequence, used to indicate an execution sequence between the self organizing network function and another self organizing network function;

a scope, used to indicate a running scope of the self organizing network function; and a state value, used to provide a running state of another self organizing network function running before the self organizing network function.

11. The device according to claim 10, wherein the scope comprises information of an area changed after running of another self organizing network function.

12. The device according to claim 10, wherein the running state comprises success, failed, or being running.

13. A self organizing network coordination system, comprising: multiple self organizing network function modules, and a self organizing network coordination device;

wherein the self organizing network coordination device comprises a processor and a non-transitory computer readable storage medium, the non-transitory computer readable storage medium stores a program, and when the program is executed by the processor, the following steps are performed:

obtaining a coordination parameter of a self organizing network function, wherein the coordination parameter comprises a starting delay, a target value, and a coordination parametric value, wherein the coordination parametric value comprises a parameter changed by running of a previous self organizing network (SON)

function or a change value of a parameter changed by running of a previous self organizing network (SON) function and the starting delay is used to indicate a period of time after which the self organizing network function is coordinately started, and the target value comprises a key performance indicator value monitored before the running of the self organizing network function;

coordinating running of the self organizing network function according to the coordination parameter, wherein the self organizing network function is coordinately started after the period of time indicated by the starting delay;

notifying a result or a state of the running of the self organizing network function after the running of the self organizing network function ends, and further notifying a parameter changed by running of the self organizing network function or a change value of a parameter changed by running of the self organizing network function, wherein the changed parameter serves as a parameter for coordinating another self organizing network function; and restoring a network setting and a network state before the running of the self organizing network function in response to a decline of the key performance indicator caused by the running of the self organizing network function, wherein, each self organizing network function module comprises the self organizing network coordination device, wherein the multiple self organizing network function modules share data to obtain their respective coordination parameters; or the self organizing network coordination device obtains data of the multiple self organizing network function modules to obtain a coordination parameter of a self organizing network function to be started, and coordinate running of the self organizing network function to be started.

14. The system according to claim 13, wherein the coordination parameter further comprises one or more pieces of the following data:

an execution sequence, used to indicate an execution sequence between the self organizing network function and another self organizing network function;

a scope, used to indicate a running scope of the self organizing network function; and a state value, used to provide a running state of another self organizing network function running before the self organizing network function.

15. A non-transitory computer readable medium having executable instructions recorded thereon, that when executed by a processing system perform:

obtaining a coordination parameter of a self organizing network function, wherein the coordination parameter comprises a starting delay, a target value, and a coordination parametric value, wherein the coordination parametric value comprises a parameter changed by running of a previous self organizing network (SON) function or a change value of a parameter changed by running of a previous self organizing network (SON) function, and the starting delay is used to indicate a period of time after which the self organizing network function is coordinately started, and the target value comprises a key performance indicator value monitored before the running of the self organizing network function;

coordinating running of the self organizing network function according to the coordination parameter, wherein the self organizing network function is coordinately started after the period of time indicated by the starting delay;

notifying a result or a state of the running of the self organizing network function after the running of the self organizing network function ends, and further notifying a parameter changed by running of the self organizing network function or a change value of a parameter changed by running of the self organizing network function, wherein the changed parameter serves as a parameter for coordinating another self organizing network function; and restoring, by the self organizing network coordination device, a network setting and a network state before the running of the self organizing network function in response to a decline of the key performance indicator caused by the running of the self organizing network function.

* * * * *